July 4, 1961 K. G. MARWING ET AL 2,991,335

ROUTINE TESTING EQUIPMENT FOR USE IN AUTOMATIC TELEPHONE EXCHANGES

Filed Nov. 18, 1957 4 Sheets-Sheet 1

INVENTORS
KENNETH GEORGE MARWING.
JOHN FRANK GREENAWAY.
DONALD HALTON.
BY
Irvin S. Thompson
ATTORNEY INVENTORS
KENNETH GEORGE MARWING.
JOHN FRANK GREENAWAY.
DONALD HALTON.
BY
Irwin S. Thompson
ATTORNEY INVENTORS
KENNETH GEORGE MARWING
JOHN FRANK GREENAWAY
DONALD HALTON
BY
Irwin S. Thompson
ATTORNEY July 4, 1961 K. G. MARWING ET AL 2,991,335

ROUTINE TESTING EQUIPMENT FOR USE IN AUTOMATIC TELEPHONE EXCHANGES

Filed Nov. 18, 1957 4 Sheets-Sheet 4

INVENTORS
KENNETH GEORGE MARWING.
JOHN FRANK GREENAWAY.
DONALD HALTON.
BY
Irvin S. Thompson
ATTORNEY

United States Patent Office 2,991,335
Patented July 4, 1961

2,991,335

ROUTINE TESTING EQUIPMENT FOR USE IN AUTOMATIC TELEPHONE EXCHANGES

Kenneth George Marwing and Donald Halton, Liverpool, and John Frank Greenaway, Taplow, England, assignors to Automatic Telephone & Electric Company Limited, Liverpool, England, a British company Filed Nov. 18, 1957, Ser. No. 697,126
Claims priority, application Great Britain Nov. 16, 1956
6 Claims. (Cl. 179—175.23)

Figure 1:
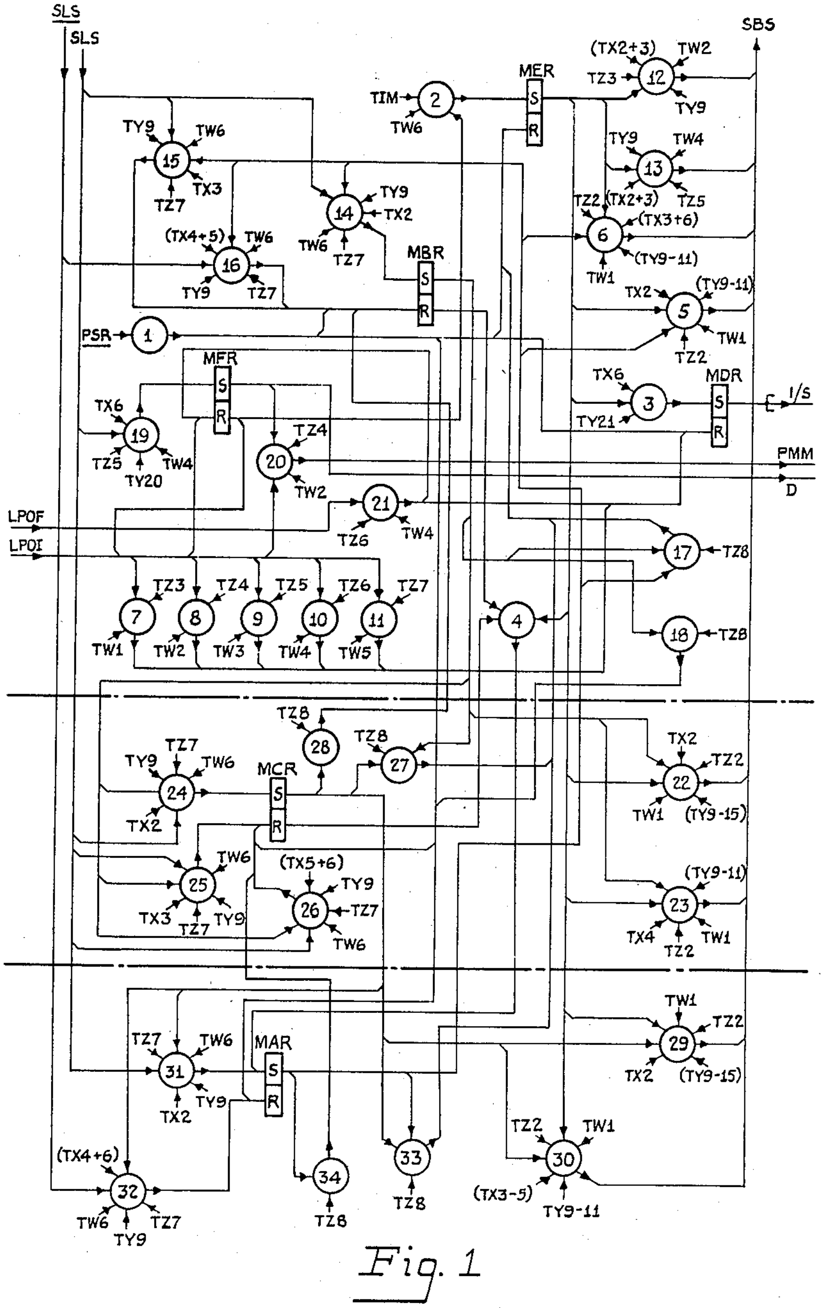

The present invention relates to the routine testing of equipment in automatic telephone exchanges, and is particularly concerned with the routine testing of register-controllers of the code-translating type employing a magnetic drum storage device.

In such register-controllers it is usual to provide common equipment for writing information into registers, reading out and transferring information and so on, the calls being handled on a time-division basis. Because so much equipment is common to every call requiring the services of the translator, it is desirable that a continuous test should be made of the equipment so that faults in its operation may be detected immediately and, if necessary, a change may be made to standby equipment.

It is the object of the invention to provide means for the routine testing in a continuous cycle of a magnetic drum type of register-controller having registering, translating, sending and metering facilities.

A register-controller of this type comprises a magnetic drum having register sections on several tracks, a library of translation and metering information also covering several tracks, and a transfer track which is used in transferring information to and from the library. Because most of the registering, translating, sending and metering circuits are common to all registers, these can be tested simply by artificially dialling a subscriber's number, and checking whether the correct routing code and numerical digits are obtained from the transmission circuit. Since, however, the registers are disposed over several tracks, it is necessary to repeat this test for a register on each track, to determine that all the reading and writing heads giving access to and from registers together with the circuits individual to each track, are functioning correctly. Furthermore, it is not sufficient to test the registers continually using the same code for each test, because the translation of this code will always be obtained from the same library track. Sufficient codes must be provided by the testing circuit to ensure that all the library tracks are referred to in the test cycle.

This latter requirement could be met by providing a circuit which artificially dials a series of exchange codes into the various registers selected for testing, and which checks that routing codes transmitted from these registers are correct, the exchange codes being such that all the library tracks are referred to in turn. It will be apparent, however, that a considerable amount of testing equipment would be needed to carry out a testing programme of this nature.

According to the invention, in a telephone system employing a registering and translating device of the magnetic drum type arranged for calls to be set up in response to the dialling of exchange code and numerical digits which are registered in one of a plurality of groups of storage blocks on the drum which includes further storage blocks bearing permanent registrations representing translations of exchange code digits, at least one of said plurality of groups of storage blocks is rendered inaccessible to calling subscribers and a predetermined registration is made in the exchange code blocks of said one group of storage blocks, the registration being replaced successively by translated registrations transferred from said further storage blocks while means effective after a predetermined number of transfers have been made determine whether the final registration in said one group of storage blocks has a value which indicates the correctness of the successive translations.

In the example to be described, the drum has six tracks containing registers, and one register from each track is made inaccessible to subscribers, and is used exclusively as a test register. This is not wasteful of switching equipment because the "register" is, in fact, merely a section of a track on the magnetic drum. The six registers chosen are located on different portions of their respective tracks, and may conveniently be adjacent, e.g. the second register on track 1, the third register on track 2 and so on. The first register on a track is not normally used. A predetermined code, either an exchange code or a special "code only" code, i.e. a code such as "999," which is not followed by a subscriber's number, is written by a circuit into the first test register. This is translated in the normal way and the routing code is transmitted from the register. Instead of being received and repeated by an associated relay set, as in the below-mentioned circuit of application No. 664,820 it is arranged that an impulse transmitted from one test register via the outgoing scanning circuit is returned to the next test register via the incoming scanning circuit and the appropriate track circuit. Thus the routing digits provided by one test register become the code digits for the next.

The routine test cycle takes the six test registers into use three times each to enable a complete test to be made of the library track equipment, ten library tracks being used. The code received by the last test register in each case is not translated or transmitted, but is checked to ensure that the previous registers have functioned correctly. During each test cycle in the complete routine test, supervisory pulses are applied to an alarm circuit, which gives an alarm if one or more of these fails to appear. These pulses indicate that the transmission of impulses from the first five test registers has taken place, and also that metering and forced release signals, and the signal indicating the end of transmission of digits from a register, have been given correctly.

Figure 2:
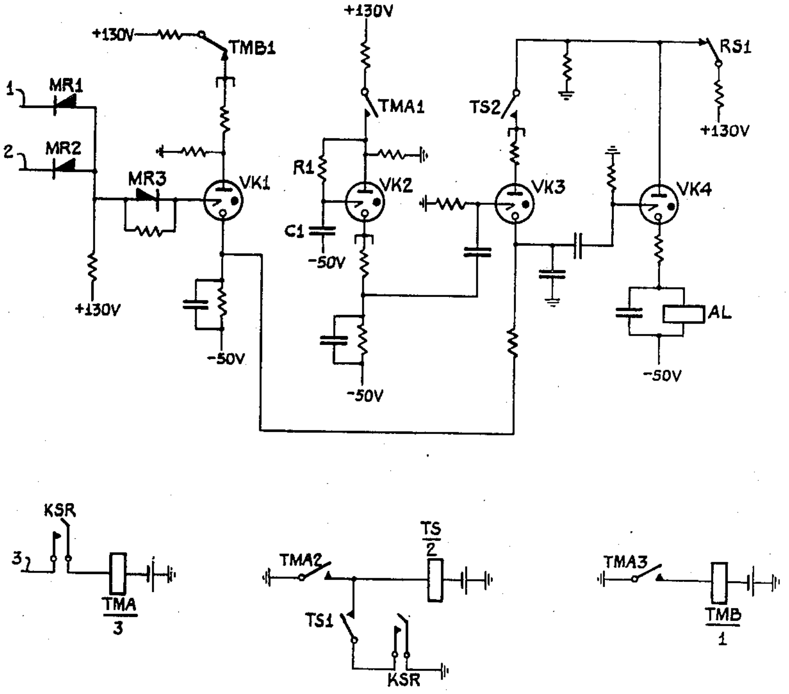
Figure 3:
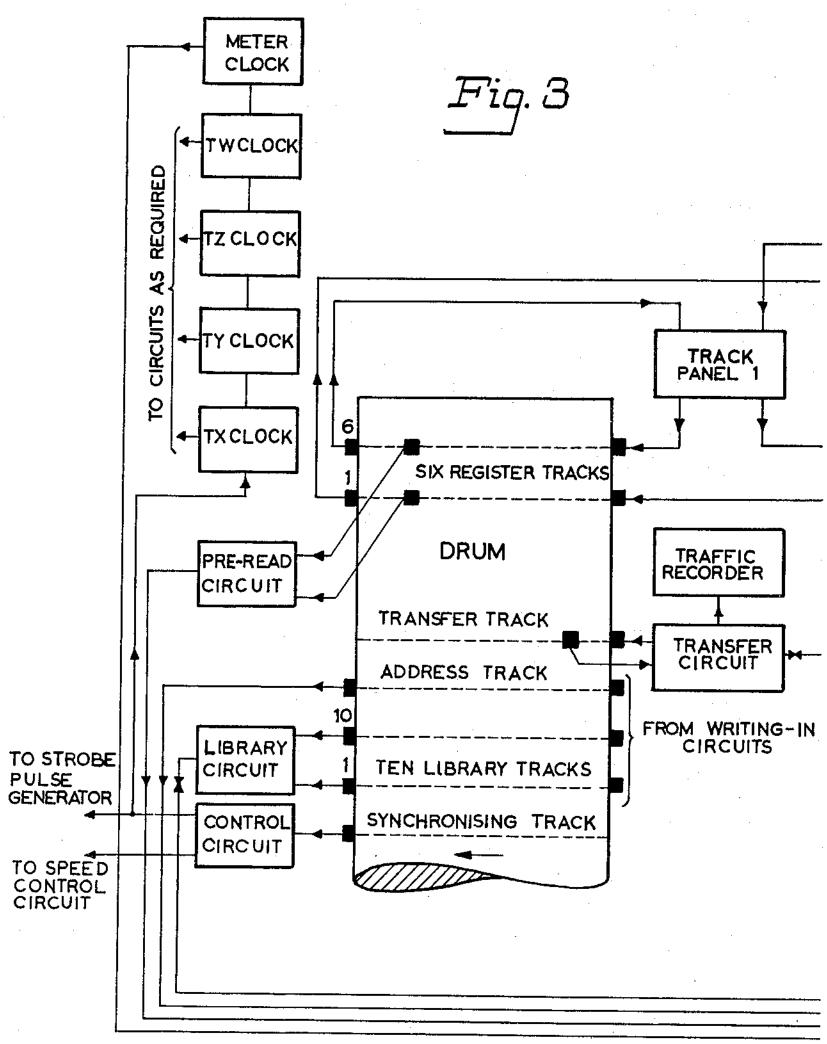
Figure 4:
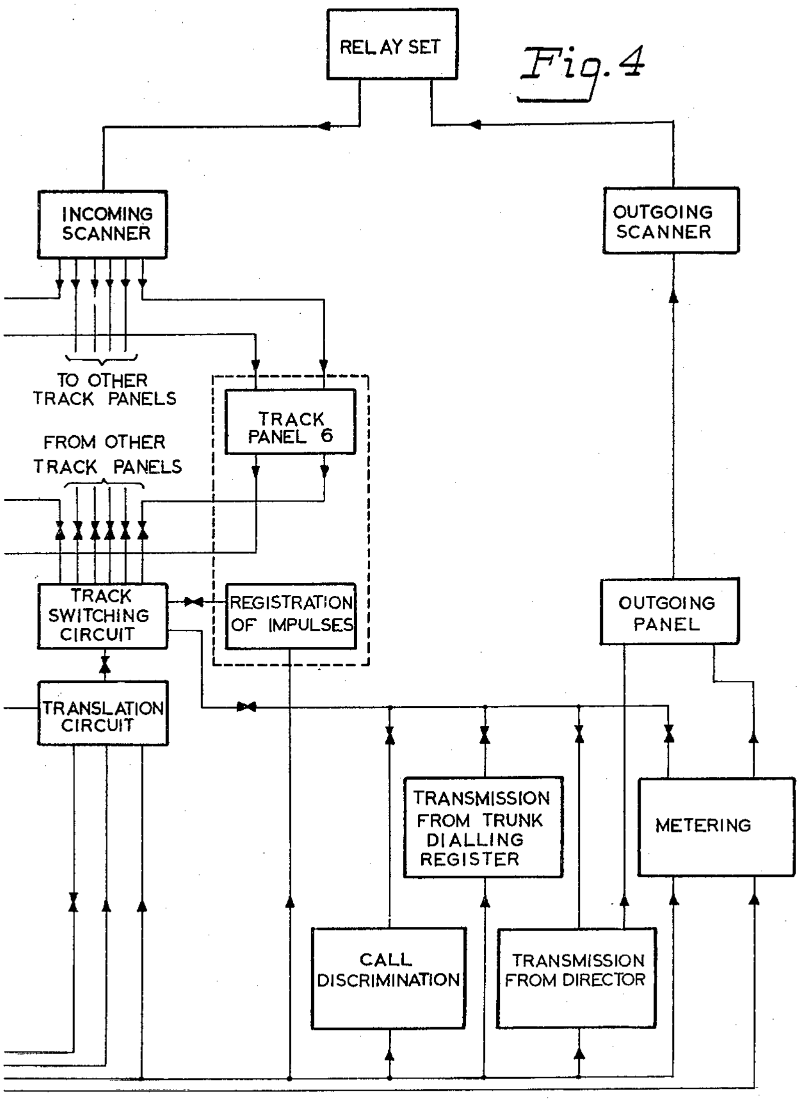

The description refers to the accompanying drawings comprising FIGS. 1 to 4. Of these FIG. 1 shows in conventional schematic form the writing in and checking circuits associated with the six test registers, FIG. 2 shows the alarm circuit and FIGS. 3 and 4 show in block schematic form the complete registering and translating device described in copending application Serial No. 664,820.

Referring first to FIGS. 3 and 4, the magnetic drums referred to are of the type in which information is stored in binary form by reversals of magnetization. Each drum 18 includes, among others, six register tracks each divided into 14 sections, 13 of which are employed as registers. There are ten library tracks, containing routing and metering codes permanently stored in blocks corresponding to similarly-positioned blocks on an address track, each of the address blocks having permanently stored in it part of an exchange code. The routing and metering information stored in the library tracks refers to the exchange code of which part is contained in the corresponding position of the address track. A further track known as the transfer track is provided, upon which dialled codes extracted from a register are circulated until a position corresponding to an address containing part of the dialled code is reached, when the appropriate routing code read from the corresponding section of a selected library track is substituted for dialled code on the transfer track, the routing code then being circulated on this track until a position corresponding to the originating register is reached, when transfer of the code to that register is effected.

Access to particular storage areas is obtained from an arrangement of clock circuits 11, 12, 13 and 14 driven through the control circuit 17 from a specially marked track on the drum, and therefore synchronised with it. The output from the control circuit is also effective on speed control arrangements for the drum and on a strobe pulse generator for a purpose to be described later. The duration of pulses is based upon the revolution period of the drum, and the pulses are related as follows:

TW pulses
: have a duration equal to the time taken for the drum to make one electrical revolution. How this differs from the mechanical revolution will be explained subsequently.

TZ pulses
: are synchronised with TW pulses, and 14 TZ pulses have the same duration as one TW pulse.

TY pulses
: are similarly related to TZ pulses, 21 TY pulses having the same duration as one TZ pulse.

TX pulses
: are so related to TY pulses that six TX pulses occur during one TY pulse.

All the pulses in a series are contiguous, and the commencement of a pulse of any series coincides with the commencement of a pulse in the series of next higher frequency.

The duration of a single TX pulse is used to define the length of track to be occupied by a single storage element containing one binary digit, this length of track passing completely under a read or write head during one TX pulse. TY pulses are used to define the length of track occupied by a block of six elemental areas and when such a block is used as a digit store, a digit representing nought to ten in binary form, together with two controlling binary digits, may be stored therein. Other uses are made of certain of these blocks in controlling and manipulating digital information. TZ pulses define the length of track occupied by a register which contains 21 storage blocks TY, and TW pulses are used to define the length of track occupied by all the registers on a single track, which is, in fact, half the length of the track.

The pulses in each series are distributed over a set of leads in a recurring cycle, there being six TW leads, 14 TZ leads, 21 TY leads and six TX leads. By combining a lead from each of these series in an "and" type of coincidence circuit, it is possible to obtain a single output pulse of duration equal to a TX pulse, at any required point in the complete cycle of TW pulses. Since the pulse cycle is synchronised with the rotation of the drum and commences as a particular slot on the drum passes under a reading head, such coincidence circuits may be used to define the passage of a particular elemental area or slot under a reading or writing head. It is therefore convenient to designate each storage position on a track by the timing pulse occurring as that particular position is scanned, e.g.

TX2.TY21.TZ5

It is sometimes necessary for a timing pulse to continue for more than one TX period, and combined timing leads may conveniently be used to reduce the number of coincidence circuits required. Where a timing lead has an output covering more than one timing period, a "+" sign is used, e.g.

(TX5+6)

Pulses from the coincidence circuits may be used to operate electronic relays, which are of the bistable type and in the set condition give an operative output on one output lead, and in the re-set condition give an operative output on a second output lead. The relays may also be operated by other similar relays. The "set" and "re-set" halves of the relay are referenced "S" and "R" respectively. In each case, it is assumed that the input signals to a relay come from the left hand side, while the output signals are taken from the right hand side of the relay. The outputs of relays and of coincidence circuits are also used to record information on the tracks of the drum, and for this purpose so-called "A" and "B" leads are employed. A "write" signal applied to an "A" lead results in a magnetic marking representing "0" being written or re-written on a track, and a "write" signal applied to a B lead results in a magnetic marking representing "1" being written or re-written on the track. If "write" signals are applied to both leads simultaneously, the effect of the B lead predominates, and a 1 is written on the track.

In order to make the writing and switching operations definite, very short strobe pulses are employed, which occur at a point towards the end of each TX pulse. The strobe pulses which, as previously mentioned are generated under the control of the control circuit 17, are ineffective on their own, but when they coincide with a relay-operating pulse or a writing pulse, the two pulses together effect the circuit operation. It was mentioned that a relay has two output conditions, dependent on the set or re-set condition of the relay. These may be indicated when describing circuit operations in symbolic form by using the relay designation alone to refer to the set condition, e.g. MAB, and by using the relay designation underlined to refer to the re-set condition, e.g. $\underline{\text{MAB}}$. Thus a circuit operation in which a relay MBK is re-set when the last storage element of a register has passed the read head may be written:

TX6.TY21—$\underline{\text{MBK}}$ showing that in the time period represented by TX6.TY21, a signal is applied to relay MBK to re-set it, whether it was previously set or not. If this relay is to be set during another part of the register scan, but only if a second relay MAK is already in the set condition, the circuit operation may be written:

MAK.TX6.TY19—MBK

This circuit, of course, would be inoperative if relay MAK were in the re-set condition, and at any other instant than during the passage of element TX6.TY19 under the read head. It should be noted that this operation is not dependent upon the signal stored in element TX6.TY19 of the register.

The various tracks have characteristic letters allotted to them as follows:

Register tracks—S
Transfer track—T
Address track—A
Library track—L

Signals appearing on signal leads connected to the read and write heads are referenced by using a three-letter combination, the first letter being "S," and the last either the track reference letter or the letter S which indicates that the leads extend from common equipments and can be switched to the heads of the six register tracks. In the case of write heads, the second letter is "A" when a 0 is to be written on the track and "B" when a 1 is to be written in accordance with the "A" and "B" signals mentioned previously. A signal read from the track has "L" for its second letter, and the difference between a 1 and a 0 is indicated by underlining the combination in the case of a 0 signal. By way of example, the circuit written

$\underline{\text{MAB}}$.SLS.TX5.TY1—MDB indicates that if relay MAB is in the re-set condition, and a 1 signal is read at any of the 14 storage positions TX5.TY1 of the register track being scanned, a signal is applied to relay MDB to set it.

It was mentioned earlier that each register has a relay set, such as relay set 22, permanently allotted to it, and the relay sets are associated in turn with the drum in a continuous scanning operation. The register tracks are continuously in use for scanning purposes, so that a register is associated with its relay set for the transfer of information once in each electrical revolution of the drum. The speed of rotation of the drum of the embodiment of the invention being described is 1800 revolutions per minute, and a revolution therefore takes 33⅓ milliseconds (ms.). It is convenient to use only half the circumference of the drum for a register track, the reading and writing heads being spaced 180° apart. This gives the advantage of effectively superimposing the reading and writing heads on these tracks, and although half of the track is short-circuited, it is considered that the loss of storage space is compensated by advantages gained. It will thus be seen that a register is examined by its track circuit twice in each mechanical revolution of the drum, i.e. at intervals of 16⅔ ms., and the electrical speed is therefore twice the mechanical speed as far as scanning the relay sets is concerned. Since a relay set is sampled each 16⅔ ms., any change of condition in the relay set due to dialling will be recorded by the register, if the dialling speed does not greatly exceed the normal ten impulses per second. It is, however, unnecessary for the common equipment to scan a register every 16⅔ ms., and the track switching circuit 26 is therefore provided to associate the register tracks in turn with the common equipment. Since there are 6 register tracks, each track will be scanned by the common equipment once every 100 ms. It is sometimes necessary to read the information stored in a register before that register passes the read head. For this purpose a "pre-read" head is employed and is positioned at a distance corresponding in track length to one register in advance of the normal reading head.

In the allocation of storage areas within a section of track used as a register, the dialled digits are allotted the storage blocks TY9–18. In the case of a local call, the exchange code digits A, B and C are stored in blocks TY9–11 respectively, and the four numerical digits are stored in blocks TY12–15. For a call taking the trunk-dialling equipment into use, the number of digits dialled is variable. The trunk-dialling prefix digit is stored in block TY9, and the remaining digits are stored in blocks TY10–18, or in as many of these as are required. The routing digits, obtained by translation of the exchange code digits or of the trunk-dialling digits, are stored in blocks TY3–8, or in as many of these as are required.

In each digit storage block TY3–18, storage elements TX3–6 are used to register the digit in binary form, element TX3 being the lowest order element ($2^0$) and TX6 being the highest order element ($2^3$) in each case. In these blocks, elements TX1 are referenced "o/g busy," i.e. "outgoing busy," and the marking in one of these elements determines whether or not a digit stored in that particular storage block is to be transmitted from the register. The corresponding elements TX2 are referenced "i/c busy," i.e. "incoming busy," the marking in one of these elements determining whether that particular storage block has a digit stored in it, or if no digit or an incomplete digit is stored in it.

The remaining elements of the register section are allotted as follows. In block TY1, elements TX2 and TX3 are used in timing an inter-digital pause during transmission of digits from the register, element TX4 is used to identify a register whose stored code digits are being translated, and elements TX5 and TX6 are used to detect an inter-digital pause when dialled impulses are being received. The markings in block TY2 are supplied by the translation part of the drum together with the routing digits. The marking in element TX1 indicates whether the call is normal, or if a false code or a "code only" code has been dialled, element TX2 is used where a record of traffic over a particular junction is being kept, and elements TX4–6 are used for storing a digit indicative of the appropriate fee for the connection.

Block TY20 is used in various timing processes, for example in timing metering pulses, in timing the forced release period and in timing the period during which further dialled impulses may be expected when determining the end of dialling in a trunk-dialling call. In block TY21, element TX2 is used to store a marking indicating that translation has been completed for the register, element TX3 is used in detecting the open or closed loop condition of the subscriber's line, element TX4 is used in storing an indication of this condition, and elements TX5 and TX6 are used in temporarily registering the receipt of a dialled impulse.

The elements not mentioned, i.e. elements TX1.TY1, TX2.TY2 and TX1.TY21 in each register are not used, and block TY19 is also unused in the present circuits. Of the 14 register sections on a track, only thirteen are employed as registers, the remaining one register being used for test purposes.

The operation of the registering and translating device takes place briefly as follows. When a calling subscriber lifts his receiver to initiate a call, his line circuit is extended to a relay set such as the relay set 22. The incoming scanner operates continuously to associate the relay sets successively with the appropriate register tracks on the drum. Each register track is provided with a track panel such as 19 and 24, the track panels being connected to the common equipment in turn by the track switching circuit 26 which is itself controlled by the TW pulses. When the calling subscribed commences dialling, the impulses are detected by the pre-read head of the appropriate register track and are transferred to the appropriate one of the storage blocks TY9–18 by the registering circuit 27. This circuit also detects the inter-digital pause and ensures that the impulses forming the next received digit are transferred to the next storage block. A call discrimination circuit 30 is effective in conjunction with the pre-read head in determining whether the call is for the local network, for a manual board or for a distant network. In the latter two cases the call is routed to a manual board or to a special register-translater respectively without reference to the translating equipment.

If the call is for the local network, the first three digits registered on the register track will be the three exchange code digits of the required exchange. The first of these digits is read by the reading head of the register track in question and is passed through the track panel, such as 24, and the track switching circuit 26 to the translation circuit 29 where it selects one of the 10 library tracks. The second and third digits are passed over the same path to the translation circuit and thence to the transfer circuit 21 where they are written on to the transfer track. The transfer track reading and writing heads are spaced apart by a distance of seven TY blocks so that the digits registered on the transfer track are circulated around the track and in each position of the digits on the transfer track they are compared with the permanent registrations on the address track until coincidence is attained. This serves to select one section of the selected library track and the translated digits on this section are now read from the library track and passed through the library circuit 16, the translation circuit 29, track switching circuit 26, track panel 24 to the writing head of the appropriate register track, and are registered as routing digits on the register track. The numerical digits are also registered on the register track.

When the first of the routing digits has been stored on the register track, impulse transmission begins and this is effected by subtracting one from the digit each time the register track is scanned by the common equipment and at the same time causing a signal to be transmitted over the track panel 24, track switching circuit 26 to the transmitting circuit 32. In response to this signal the transmitting circuit 32 transmits one impulse through the outgoing panel 28, the outgoing scanner 25 to the relay set 22. Since each register track is scanned every 100 ms., it will be understood that impulse transmission from the transmitting circuit 32 takes place at the rate of 10 c.p.s. In this way, the various routing digits and the numerical digits are transmitted in succession to set up the call to the called subscriber.

The library in addition to returning routing digits also returns a meter code digit to the register to enable the call to be metered on a multi-fee basis. Metering is effected by providing a series of meter clock pulses from the meter clock 36 and selecting the appropriate ones of the meter clock pulses as determined by the meter code digit. The selection of the metering pulses is effected in the metering circuit 33. When the called subscriber answers, a signal is sent from the relay set 22 through the incoming scanner 23, track panel 24 to the register track writing head. When this signal is read by the pre-read head, an indication is passed to the metering circuit 33 to initiate the metering operation which takes place within the cycle time of the series of meter clock pulses and which consists in the transmission of one or more pulses to the calling subscriber's meter through the outgoing panel 28, the outgoing scanner 25 and the relay set 22.

If the registering and translating device is employed as a trunk-dialling register, that is it is capable of setting up connections outside the local director network, it is necessary to exert a control over the digits which are transmitted. For instance, in some cases it may be necessary to re-transmit some or all of the dialled exchange code digits together with the routing digits and the dialled numerical digits or it may be that the routing and numerical digits alone are sufficient. It is also possible that no numerical digits need to be retransmitted. Discrimination as to the first digit to be transmitted and also the total number of digits to be transmitted is effected by the control circuit 31 in response to a discriminating code returned by the library to the register at the same time as the routing digits. The discriminating code serves to store a number in the control circuit and if transmission is to begin with the exchange code digits, the number determines the number of digits to be transmitted. If transmission is to begin with the routing digits, the number determines which of the dialled digits must not be transmitted. The discriminating function is initiated by a signal sent from the pre-read head to the control circuit when a routing code has been returned by the library to the register. In the first case mentioned previously the number stored in the control circuit is changed by one each time a digit is transmitted by the transmitting circuit 32 and the control circuit prevents the transmission of further digits when the number reaches a predetermined value. In the second case, the number is changed by one on each scan of the register by the common equipment to prevent the transmission of the exchange code digits until the number attains a predetermined value, the remaining digits being transmitted.

Provision is also made for recording traffic to a particular exchange and this is effected at the translation stage. The translation code in the library corresponding to the particular exchange is marked in a characteristic manner and this characteristic marking is detected when the translation is written on to the transfer track. The characteristic marking sets a relay in the transfer circuit 21 and this relay provides an output for a counting circuit forming the traffic recorder 20.

The checking circuits with which the present invention is concerned are connected between the leads extending to the incoming and outgoing scanners 23, 25. Effectively the checking circuits take the place of the relay sets at those positions of the incoming and outgoing scanners at which access is obtained to the registers which are inaccessible to subscribers.

Referring now to the detailed circuits shown in FIGS. 1 and 2, it should be explained that as regards FIG. 1, the various coincidence circuits are numbered 1, 2, 3 and so on in the order in which they become effective and these numbers are also shown in the description against the written form of the coincidence circuit. The coincidence circuits and relays shown as circles and rectangles respectively in FIGS. 1 and 2 are described in A.T.E. Journal, volume 13, No. 1, January 1957, pages 42–54.

The registers used for routine testing in this example are:

(1) TZ2.TW1
(2) TZ3.TW2
(3) TZ4.TW3
(4) TZ5.TW4
(5) TZ6.TW5
(6) TZ7.TW6 and it will be seen that the test registers are adjacent and located on successive tracks.

When the routine cycle is to be started, key-switch KSR (FIG. 2) is operated which causes certain relays to be switched to the re-set condition. A signal $\underline{PSR}$ is applied via the key-switch to relays MAR, MBR, MCR, MDR and MER, which are re-set, the circuit being indicated by:

$$\underline{PSR}\text{—}\underline{MAR}.\underline{MBR}.\underline{MCR}.\underline{MDR}.\underline{MER} \quad (1)$$

The routine test equipment now awaits a timing pulse generated by exchange equipment. This pulse occurs once every 30 seconds and is here designated TIM. When the pulse is received, relay MER is set during the scan by the common equipment of the last register track in the scanning cycle, in preparation for the start of the scan of test registers. Assuming that six register tracks are in use, relay MER will be set during the coincidence of signals TIM and TW6, by the circuit:

$$TIM.\underline{MFR}.TW6\text{—}MER \quad (2)$$

the input from the re-set side of relay MFR being added to this coincidence circuit to avoid its re-operation at a later stage when the metering circuit is being tested. With relay MER set, relay MDR is set on the next coincidence of clock pulses TX6 and TY21 by the circuit:

$$MER.TX6.TY21\text{—}MDR \quad (3)$$

Relay MAR, which controls the first test cycle, is set at this stage by the set condition of relay MER, when relays MBR and MCR, which control the second and third test cycles respectively, are in the re-set condition. The circuit is:

$$\underline{MBR}.\underline{MCR}.MER\text{—}MAR \quad (4)$$

With relays MAR and MER both in the set condition, the first code "999" is written into the first test register (TZ2.TW1) by the two circuits:

$$MAR.MER.TX2.(TY9\text{–}11),TZ2.TW1\text{—}SBS \quad (5)$$

and $$MAR.MER.(TX3+6).(TY9\text{–}11).TZ2.TW1\text{—}SBS \quad (6)$$

The first of these circuits causes a 1 to be written in the "incoming busy" element TX2 of each of the three exchange code digit storage blocks TY9–11 of the first test register to initiate translation of the code, while the second causes a 1 to be written in elements TX3 and TX6 of each of these storage blocks, the markings being equivalent to the digit "9" in the binary code.

The code "999" now stored in the first test register is translated in the normal manner as fully described in application Ser. No. 664,820, the routing digits being returned to the appropriate storage blocks of the register, where they are detected and transmitted to the outgoing scanning circuit as pulses. These pulses, in the form of signals on lead POI, are generated at the end of the scan by the common equipment of the register in question, and a signal POI is used to produce an impulse of correct length and shape, designated LPOI, which occurs during the scan of the following register. Thus an impulse generated due to a digit stored in a register TZ2 would appear as a signal LPOI during the scan of a register TZ3, and so on.

Each LPOI signal obtained from any of the test registers, is used to re-set relay MDR, which was first set by the circuit:

MER.TX6.TY21—MDR (3)

the re-setting circuits for pulses from the first five test registers being:

LPOI.TZ3.TW1.$\underline{\text{MFR}}$—$\underline{\text{MDR}}$ (7)
LPOI.TZ4.TW2.$\underline{\text{MFR}}$—$\underline{\text{MDR}}$ (8)
LPOI.TZ5.TW3.$\underline{\text{MFR}}$—$\underline{\text{MDR}}$ (9)
LPOI.TZ6.TW4.$\underline{\text{MFR}}$—$\underline{\text{MDR}}$ (10)

and

LPOI.TZ7.TW5.$\underline{\text{MFR}}$—$\underline{\text{MDR}}$ (11)

no output pulse being obtained from the last test register TZ7.TW6. The output from the "set" side of relay MDR is connected to the leads I/S of the incoming scanning circuit associated with the test registers so that as each impulse is detected by this relay, it is fed via the appropriate track circuit into the test register being scanned at that time. Due to the time relation beween the scan of a register and the appearance of an LPOI impulse derived from it, the impulses from one test register will always be fed to the next test register in sequence, and the routing digits of one register will thus be transferred to the next as exchange code digits. After each impulse has been stored, relay MDR is again set at the end of the scan of the register by the previously-mentioned circuit:

MER.TX6.TY21—MDR (3)

so that the impulse is not written into a further test register. The input $\underline{\text{MFR}}$ is employed in circuits (7) to (11) to avoid interference with the meter pulse testing circuit to be described later.

The signal LPOI derived from each of the first five test registers is taken to a separate input of the alarm circuit, which will be described later. The failure of transmission of impulses from a register on any track may thus be detected, and an indication is given of the track on which the failure occurs. A signal POC is also generated by the common equipment when the transmission of impulses from a register is complete, and the correct occurrence of this signal is also tested by the alarm circuit. It is convenient to employ the signal generated at the end of transmission from the first test register. Because "999" is a "code only" code, the translation information will in this case result in the "outgoing busy" elements TX1 of the numerical digit storage blocks to be marked with a 1, so that the transmission circuit will pass over these without waiting for further dialled impulses to be registered.

It may be possible by suitable choice of the initial code digits written into the first test register to obtain a series of translations which ensures that all the library tracks are tested. This, however, may not always be practicable, and where such a series does not occur naturally, a special library track may be employed which is not accessible to subscribers. This track may contain specially prepared translations which ensure that all library tracks are eventually referred to in the routine cycle. The special library track may for example, be reached by an initial digit "1," or the numbers 11 to 15 can be used, since these can be registered in a four-unit binary code, but cannot be dialled in a single impulse train by a subscriber. The special initial digit may be written into one or more of the test registers in the first code digit storage block, so that the translation obtained from the preceding test register will be stored in the second and third code digit storage blocks and, if necessary, in the numerical digit storage blocks. In the present example, "1" is used as the special initial code digit, and the following two circuits are provided for writing this into the second and fourth test registers:

MER.(TX2+3).TY9.TZ3.TW2—SBS (12)

and

MER.(TX2+3).TY9.TZ5.TW4—SBS (13)

A typical series of translations is given for the first test cycle in the following table:

| Test register number | Digits written in— | Code from previous register | Translation |
|---|---|---|---|
| 1 | 999 | (999) | 89 |
| 2 | 1 | (1)89 | 523 |
| 3 | | 523 | 321 |
| 4 | 1 | (1)32 | 0 |
| 5 | | 0 | 6 |
| 6 | | 6 | not used |

In this cycle, library tracks 9, 1, 5 and 0 are tested in that order. If the code written in the sixth test register at the end of the cycle is 6, this is an indication that the equipment so far tested is functioning correctly. This is ascertained by the circuits:

MAR.SLS.TX2.TY9.TZ7.TW6—MBR (14)

MAR.SLS.TX3.TY9.TZ7.TW6—$\underline{\text{MBR}}$ (15)

and

MAR.$\underline{\text{SLS}}$.(TX4+5).TY9.TZ7.TW6—$\underline{\text{MBR}}$ (16)

The first of these circuits sets relay MBR when the reading head on track TW6 encounters a 1 in element TX2.TY9 of the last test register, indicating that a complete digit has been registered in its first code digit storage block. The relay remains in the set condition unless a 1 is encountered in element TX3 of the block, or a 0 is encountered in elements TX4 or TX5, any of which contingencies would indicate that a digit other than "6" has been registered. These tests are made by the last two circuits. It is unnecessary to test element TX6.TY9 in addition. If relay MBR remains in the set condition, the second test cycle is initiated after an interval. If the relay is re-set, an alarm is set up when the second test cycle fails to be completed.

If the first test cycle has been completed satisfactorily relay MBR will be in the set condition during the scan of a register TZ8. The set condition of relay MBR at this point is used to re-set relays MER and MAR in the circuits:

MAR.MBR.TZ8—$\underline{\text{MER}}$ (17)

and

MBR.TZ8—$\underline{\text{MAR}}$ (18)

The output from the re-set side of relay MER is taken to a circuit SS which restrains the transmission of impulses from the six test registers, and this prevents further operation of circuits 7–11. This is unimportant in the first test cycle, when only a single digit is received by the sixth test register, but it is of importance in the second and third cycles, when the routing code of the fifth test register consists of more than one digit. This will be mentioned during the description of the second test cycle. The re-setting of relay MAR prevents operation of circuits (4) and (5) in the second and third test cycles, when different initial codes are written into the first register.

In order to test the meter pulse arrangements, it is necessary to complete the transmission of impulses from one of the test registers and return to it a pulse simulating the "called subscriber answered" condition. It is convenient to use a register in which a "code only" code has been registered, so that no numerical digits need be written in and transmitted before metering pulses can be generated. The second test register, TZ3.TW2, is chosen in the present example because the use of the special library track (1) in connection with this register enables an artificial "code only" indication to be returned with the translation of the code received from the first test register.

A "called subscriber answered" pulse is conveniently generated by means of the forced release timing circuit of one of the test registers. This timing circuit, however, is not initiated in a register in which a "code only" code has been received, and the choice is therefore limited to the third and fourth test registers as the only ones available for this function. In the present example, register TZ5.TW4 is chosen. It will be recalled from the description of application Ser. No. 664,820 that the timing count proceeds in block TY20 of a register, and is complete when each of the six storage elements has 0 written in it after a count of 64. It will be apparent that the count is half completed when the number 32 is registered in the block, i.e. when 1 is first written in element TX6.TY20, and this provides a convenient delay (about 7.5 seconds) before the "called subscriber answered" pulse is generated.

Relay MFR is set by the circuit:

SLS.TX6.TY20.TZ5.TW4—MFR (19)

which operates about 7.5 seconds after the code digits have been received by register TZ5.TW4. The output from the "set" side of relay MFR is connected to the "D" or "called subscriber answer" lead of the incoming scanning circuit associated with test register TZ3.TW2. When this signal has been received, the appropriate metering signals POI are generated for the register in the normal way, and for each POI pulse, an impulse LPOI of suitable length will be produced during the scan of the following register TZ4. This is used to set a meter relay PMM in the circuit:

LPOI.TZ4.TW2.MFR—PMM (20)

The set condition of this relay returns a metering check pulse to the alarm circuit. Relay MFR is included in this coincidence to avoid interference with circuit (8) previously mentioned.

Relay MFR is later re-set when the forced release timing period of test register TZ5.TW4 is complete. The signal POF generated at this instant gives rise to an impulse LPOF, which occurs during the scan of the next register, TZ6, and is used in the circuit for re-setting relay MFR;

LPOF.TZ6.TW4—$\underline{\text{MFR}}$ (21)

This circuit is also used to re-set relay MDR:

LPOF.TZ6.TW4—$\underline{\text{MDR}}$ (21)

It was mentioned previously that the output from the set side of the latter relay is connected to the test register leads I/S of the incoming scanning circuit, and the removal of this signal is therefore equivalent to the opening of a subscriber's line loop. When relay MDR is re-set, the six test registers clear in the normal manner. The signal LPOF obtained from the fourth test register is also employed as a test signal for the forced release circuit, and is applied to the alarm circuit for this purpose.

The initial conditions now exist, with the exception that relay MBR is in the set condition. The second test cycle is initiated when a second pulse TIM is received, when relay MER is set by the previously mentioned circuit:

TIM.$\underline{\text{MFR}}$.TW6—MER (2)

The set condition of relays MBR and MER now enables a new code, "222" in the present example, to be written into the first register, by means of the two circuits:

MBR.MER.TX2.(TY9–15).TZ2.TW1—SBS (22)

and

MBR.MER.TX4.(TY9–11).TZ2.TW1—SBS (23)

The first of these two circuits writes a 1 in the "incoming busy" elements TX2 of the code and numerical digit storage blocks TY9–15 of the first test register TZ2.TW1. It is necessary to mark the numerical storage blocks in this way because, as mentioned earlier, the first test register is used to test the "end of transmission" signal POC, which is only given after all the stored numerical digits have been transmitted, or in the case of a "code only" code, after the routing digits have been transmitted. Since "222" is not a "code only" code, markings are artificially written into the "incoming busy" elements of the numerical digit storage blocks to enable the transmission circuit to pass over these and so give an "end of transmission" indication. This, of course, was not necessary in the first test cycle, where the code "999" was used, as this is a genuine "code only" code. The second of the two circuits (23) writes a 1 in element TX4 in each of the exchange code digit storage blocks of the first test register, this marking being equivalent to the registration of the number "2" in binary form in each case.

The previously mentioned circuits (3) and (7) to (13) now operate as in the first test cycle, the translation of the code in one test register being transmitted in impulse form into the following test register until a first code digit has been written into the sixth test register. A typical series of translations for the second test cycle is given in the following table.

| Test register number | Digits written in— | Code from previous register | Translation |
|---|---|---|---|
| 1 | 222 | (222) | 276 |
| 2 | 1 | (1)27 | 348 |
| 3 | ---------- | 348 | 322 |
| 4 | 1 | (1)32 | 437 |
| 5 | ---------- | 437 | 278 |
| 6 | ---------- | 2 | not used |

In this last cycle, library tracks 2, 1, 3 and 4 are consulted.

The circuits used for detecting the digit "6" in the last test register on the first test cycle are now inoperative due to the re-set condition of relay MAR, and three further circuits are employed to detect the presence of the digit "2" stored in the first code digit storage block of the last test register. These circuits are:

MBR.SLS.TX2.TY9.TZ7.TW6—MCR (24)

MBR.SLS.TX3.TY9.TZ7.TW6—$\underline{\text{MCR}}$ (25)

and

MBR.SLS.(TX5+6).TY9.TZ7.TW6—$\underline{\text{MCR}}$ (26)

The first of these three circuits sets relay MCR during the scan of element TX2 of the first code digit storage block of the last test register as soon as a complete digit has been stored in the block. The second re-sets relay MCR if a 1 marking is detected in element TX3, and the third re-sets relay MCR if a 1 marking is detected in elements TX5 or TX6. Thus only a marking in element TX4, indicating the presence of the digit "2" in the block, allows relay MCR to remain in the set condition.

If relay MCR remains in the set condition through the scan of register TZ7, relay MER is re-set during the scan of register TZ8 by the circuit:

MBR.MCR.TZ8—$\underline{\text{MER}}$ (27)

to prevent further operation of circuits (7) to (11), as at the end of the first test cycle. This avoids further digits of the routing code in the fifth test register being transferred to the sixth register, which would cause relay MDR to be re-set by the operation of circuit (11), and because relay MER is now re-set, relay MDR would not be further set by circuit (3), so that the registers would be prematurely cleared metering and forced release signals had been checked. The set condition of relay MCR is also used to re-set relay MBR in the circuit:

$$\mathrm{MCR.TZ8}\text{—}\underline{\mathrm{MBR}} \qquad (28)$$

and this disables circuits (22) and (23), so that a different code may be written into the first test register on the third test cycle. A meter pulse is derived from the third test register as in the first test cycle and the transmission of impulses, end of transmission signal and forced release signal are again tested by the alarm circuit. The six registers are cleared when the forced release period of the fifth test register expires, when relay MDR is again re-set by circuit (21). At the end of this cycle, only relay MCR remains in the set condition.

The third test cycle is initiated on the occurrence of the next pulse TIM, when the relay MER is again set by the previously mentioned circuit:

$$\mathrm{TIM.}\underline{\mathrm{MFR}}\mathrm{.TW6}\text{—}\mathrm{MER} \qquad (2)$$

The code written into the first test register at the commencement of the third cycle is "777" in the present example. Similar circuits are provided to those for writing the code "222" in the second test cycle. The circuit:

$$\mathrm{MCR.MER.TX2.(TY9\text{–}15).TZ2.TW1}\text{—}\mathrm{SBS} \qquad (29)$$

marks all the "incoming busy" elements of the code and numerical digit storage blocks of the register, while the circuit:

$$\mathrm{MCR.MER.(TX3\text{–}5).(TY9\text{–}11).TZ2.TW1}\text{—}\mathrm{SBS} \qquad (30)$$

writes the code "777" into the code digit storage blocks.

The previously mentioned circuits (7) to (13) and (19) to (21) function as in the previous cycle. A typical series of translations for the third test cycle is given in the following table:

| Test register number | Digits written in— | Code from previous register | Translation |
|---|---|---|---|
| 1 | 777 | (777) | 04310 |
| 2 | 1 | (1)04 | 622 |
| 3 | | 622 | 286 |
| 4 | 1 | (1)28 | 844 |
| 5 | | 844 | 0440 |
| 6 | | 0 | not used |

In this cycle, the registers refer to library tracks 7, 1, 6 and 8, so that in the complete test, all of the library tracks are used. The circuit:

$$\mathrm{MCR.SLS.TX2.TY9.TZ7.TW6}\text{—}\mathrm{MAR} \qquad (31)$$

causes relay MAR to be set when a complete digit is registered in the first code digit storage block of the last test register, and the circuit:

$$\mathrm{MCR.}\underline{\mathrm{SLS}}\mathrm{.(TX4+6).TY9.TZ7.TW6}\text{—}\underline{\mathrm{MAR}} \qquad (32)$$

re-sets the relay in the event of a digit other than "0" being stored. If the test is satisfactory, the set condition of relay MAR as register TZ8 is scanned is used to re-set relays MER and MCR in the circuits:

$$\mathrm{MAR.MCR.TZ8}\text{—}\underline{\mathrm{MER}} \qquad (33)$$

and $$\mathrm{MAR.TZ8}\text{—}\underline{\mathrm{MCR}} \qquad (34)$$

Relay MAR now being in the set condition and all the remaining relays being re-set, the routine test is able to re-commence with the first test cycle on the occurrence of the next pulse TIM.

Referring now to the alarm circuit shown in FIG. 2, a coincidence circuit of conventional type is provided for each signal to be tested, comprising leads such as 1 and 2 and diodes MR1–3. The leads 1 are connected individually to the signal leads LPOF, PMM and so on, of the register scanning circuit, while the corresponding leads 2 are connected to the timing lead defining the particular register which should produce the signal. For example, a lead 1 connected to the signal lead LPOF would have its corresponding lead 2 connected to timing lead TZ6, to limit the response of the input circuit to a forced release signal from the fourth test register only.

Each coincidence circuit gives access to the trigger electrode of a gas discharge tube such as VK1, which is normally non-conducting, but is arranged to strike when coincidence occurs of signals on the associated pair of input leads. A tube VK3 shares the cathode circuit of each tube VK1, and if a tube VK1 has been fired, the cathode potential of the associated tube VK3 is raised by about 50 volts, i.e. to a potential near that of its trigger electrode.

A single tube VK2 is provided which has a number of cathode circuits, each individually connected via a capacitor to the trigger electrode of a tube VK3. The cathodes of the latter tubes are capacitively connected to the trigger electrodes of corresponding tubes VK4, which are each connected in series with an alarm relay such as AL.

The circuit operates as follows:

When the key-switch KSR, which is also used to initiate the routine test cycle, is operated manually, a circuit is prepared by which a pulse TIM received over lead 3 will momentarily operate relay TMA. The operation of relay TMA at contacts TMA1 connects the H.T. positive supply to the anode of tube VK2, and the potential of the trigger electrode of this tube is also raised as capacitor C1 is charged through resistor R1. When the trigger electrode is raised to a sufficiently positive potential, tube VK2 fires, and a pulse is applied from its various cathode circuits to the trigger electrodes of all the tubes VK3.

Assuming a test cycle to have been completed, each tube VK1 should have been fired by the appropriate pulse it is arranged to test, and if all these pulses have been received correctly, all the tubes VK3 will have their cathodes raised in potential. If this is the case, a pulse received by a tube VK3 from tube VK2 will not on its own be sufficient to break down the trigger cathode gap, and none of the tubes VK3 will fire. If, however, one or more test signals have not been received correctly by the alarm circuit, the appropriate tube or tubes VK1 will not be fired, and the corresponding tube or tubes VK3 will be primed due to the −50 v. connection to their cathodes. Such tubes would be in a condition to be fired by a pulse received from tube VK2, and on firing would apply from their cathodes a pulse to the corresponding tubes VK4. When a tube VK4 fires, its associated alarm relay AL is operated.

Returning to the operation of relay TMA, contacts TMA2 complete a circuit for relay TS, which operates and self-holds over its contacts TS1 in series with further contacts of the key-switch KSR. Contacts TMA3 complete a circuit for relay TMB which also operates. After relay TMA has operated to test that all tubes VK1 have been fired, in the manner just described, the operation of relay TMB removes the positive H.T. connection from the anodes of tubes VK1, which are thereby extinguished. Contacts TS2, which remain closed until key-switch KSR is released, are provided to withhold the H.T. connection from tubes VK3 until after tube VK2 has first fired. This avoids a false alarm condition being set up when tube VK2 fires on the occurrence of the same pulse TIM which initiates the test cycle, at which time no tubes VK1 will be fired. After an alarm is given, the appropriate tubes VK3 and VK4 remain conducting until a re-set key (not shown) is thrown when the alarm is attended to, when contacts RS1 open momentarily to extinguish the conducting tubes VK3 and VK4 and thereby to release the alarm relay which was operated.

A conventional alarm circuit may be provided, with the various relays such as AL giving individual visual indication of the fault which has occurred, and a common audible alarm may be provided. In the present example eight signals are tested, namely completion of transmission from a register (LPOC), metering pulse (PMM), forced release (LPOF) and transmission of digits from each of the first five test registers (LPOI).

In the case of the latter signal, it is only necessary for the alarm circuit to test that impulses are generated, without being concerned that the correct number of impulses has been transmitted. If the transmission of digits from any register were incorrect, the appropriate code would not appear in the last test register, and the subsequent test cycle would not, therefore, be initiated. In such a case, when the next TIM pulse occurred, none of the tubes VK1 in the alarm circuit would be fired, and all the relays AL would operate.

Relay TMA releases at the end of the TIM pulse, causing tube VK2 to be extinguished and also releasing relay TMB. On the release of the latter relay, the H.T. supply is restored to tubes VK1.

It will be understood that while the invention has been applied to a register-controller system having a magnetic drum provided with six register tracks and each track has one test register, the invention is not limited to such an arrangement. For instance, it is possible to apply the invention to a smaller capacity drum where a single test register may be sufficient, the translated digits being written over the digits in the test register which gave rise to the translation. The essential feature of the invention is that the initial registration in the test register determines what digit or digits should be present at the end of the test, means being provided to give an indication when the latter digit or digits are not present.

We claim:

1. In a registering and translating device of the magnetic drum type for use in a telephone system and having groups of storage blocks on the drum for the registration of dialled exchange code and numerical digits and having further storage blocks on the drum bearing permanent registrations representing translations of exchange code digits, and including means for transferring to one of said groups of storage blocks having dialled exchange code digits registered therein, translated registrations as determined by said exchange code digits from said further storage blocks, the provision of checking circuits comprising means for automatically registering a plurality of predetermined digits in one of said groups of storage blocks inaccessible to calling subscribers, means for replacing the registration comprising said plurality of predetermined digits successively by translated registrations transferred from said further storage blocks, means effective after a predetermined number of transfers have been made for determining whether the final registration has a predetermined value and alarm means operative in case said final registration has a value different from said predetermined value.

2. In a registering and translating device of the magnetic drum type for use in telephone systems and having groups of storage blocks arranged in a plurality of tracks on the drum for the registration of dialled exchange code and numerical digits and having further storage blocks on the drum bearing permanent registrations representing translations of exchange code digits, and including means for transferring to one of said groups of storage blocks having dialled exchange code digits registered therein, translated registrations as determined by said exchange code digits from said further storage blocks, the provision of checking circuits comprising means for automatically registering a plurality of predetermined digits in one of said groups of storage blocks on one of said tracks and inaccessible to calling subscribers, means for registering in another of said groups of storage blocks also inaccessible to calling subscribers on a second of said tracks at least certain of the digits obtained from said permanent registration as a result of a translation operation on said predetermined digits, means for registering in a further one of said groups of storage blocks also inaccessible to calling subscribers on a third of said tracks the digits obtained from said permanent registrations as a result of a translation operation on said certain digits and an additional digit, means for repeating said translating and registering operations until a registration is effected in a group of storage blocks also inaccessible to calling subscriber on the last of said tracks, means for determining whether the final registration has a predetermined value and alarm means operative in case said final registration has a value different from said predetermined value.

3. In a registering and translating device of the magnetic drum type for use in telephone systems and having groups of storage blocks arranged in a plurality of tracks on the drum for the registration of dialled exchange code and numerical digits, one group of storage blocks on each track being inaccessible to calling subscribers and having further storage blocks on the drum bearing permanent registrations representing translations of exchange code digits, and including means for transferring to one of said groups of storage blocks having dialled exchange code digits registered therein, translated registrations as determined by said exchange code digits from said further storage blocks, the provision of checking circuits comprising means for successively effecting predetermined registrations in the exchange code digit blocks of each of said inaccessible groups of storage blocks, at least part of the registration in each of said inaccessible groups of storage blocks subsequent to the first being obtained from said permanent registrations due to the translation of the registration in the previous one of said inaccessible groups of storage blocks, means for determining whether the registration in the last of said inaccessible groups of storage blocks has a predetermined value and alarm means operative in case the final registration has a value different from said predetermined value.

4. In a registering and translating device of the magnetic drum type for use in telephone systems and having registers each consisting of groups of storage blocks arranged in a plurality of register tracks on the drum for the registration of dialled exchange code digits and numerical digits, one register on each track being inaccessible to calling subscribers and said drum having further storage blocks arranged in a plurality of library tracks and bearing permanent registrations representing translations of exchange code digits, and including means for transferring to one of said registers having dialled exchange code digits registered therein, translated registrations as determined by said exchange code digits from said further storage blocks, the provisions of checking circuits comprising a source of equally spaced test signals, means responsive to a test signal for registering an initial registration in the first of said test registers and for initiating a cycle of test operations consisting of successively effecting predetermined registrations in the exchange code digit blocks of said test registers at least part of the registration in each of said test registers subsequent to the first being obtained from one of said library tracks as a result of the translation of the registration in the previous test register, means for repeating said cycle of operations with a different initial registration in the first of said test registers to form a test sequence whereby each library track is referred to at least once during the test sequence, means for determining at the end of each cycle of test operations whether the registration in the last of said test registers has a predetermined value and alarm means operative in case the registration in said last test register has a value different from said predetermined value.

5. A registering and translating device of the magnetic drum type for use in telephone systems and comprising a plurality of register tracks on the drum, each track consisting of a plurality of registers including a test register inaccessible to calling subscribers, each of said registers being formed by a plurality of storage blocks, a plurality of library tracks on the drum bearing permanent registrations representing translations of exchange code digits, checking circuits, means for registering predetermined digits in the exchange code digit storage blocks of said test registers successively, means for obtaining successively from said library tracks translated digits corresponding to said predetermined digits registered in said test registers, means responsive to the registration of translated digits in a test register for transmitting through said checking circuits to the next test register at least some of said translated digits, means for registering said translated digits in the exchange code digit storage blocks of said next register to form at least some of said predetermined digits, means in said checking circuits for determining whether the predetermined digits registered in the last test register have predetermined values and alarm means operative in case the predetermined digits registered in said last test register have values different from said predetermined values.

6. A registering and translating device as claimed in claim 5 and comprising means for generating a signal simulating the answering of a called subscriber, means in said checking circuits responsive to said signal for initiating the generation of metering pulses and means in said checking circuits for checking the metering pulses generated.

References Cited in the file of this patent

UNITED STATES PATENTS

| | | |
|---|---|---|
| 2,328,750 | Smith | Sept. 7, 1943 |
| 2,680,155 | Molnar | June 1, 1954 |
| 2,723,311 | Malthaner | Nov. 8, 1955 |